D. W. DAKE.
Butter-Workers.

No. 145,338.

Patented Dec. 9, 1873.

WITNESSES.
N. C. Gridley
J. H. Lawlor

INVENTOR.
Daniel W. Dake

UNITED STATES PATENT OFFICE.

DANIEL W. DAKE, OF BELOIT, WISCONSIN.

IMPROVEMENT IN BUTTER-WORKERS.

Specification forming part of Letters Patent No. 145,338, dated December 9, 1873; application filed September 11, 1873.

*To all whom it may concern:*

Be it known that I, DANIEL W. DAKE, of Beloit, in the county of Rock and State of Wisconsin, have invented a new, useful, and Improved Butter-Worker, of which the following is a full, clear, and exact description, which will enable others skilled in the art to which my invention appertains to make and use the same, reference being had to the accompanying drawings forming a part hereof, in which—

Figure 1:
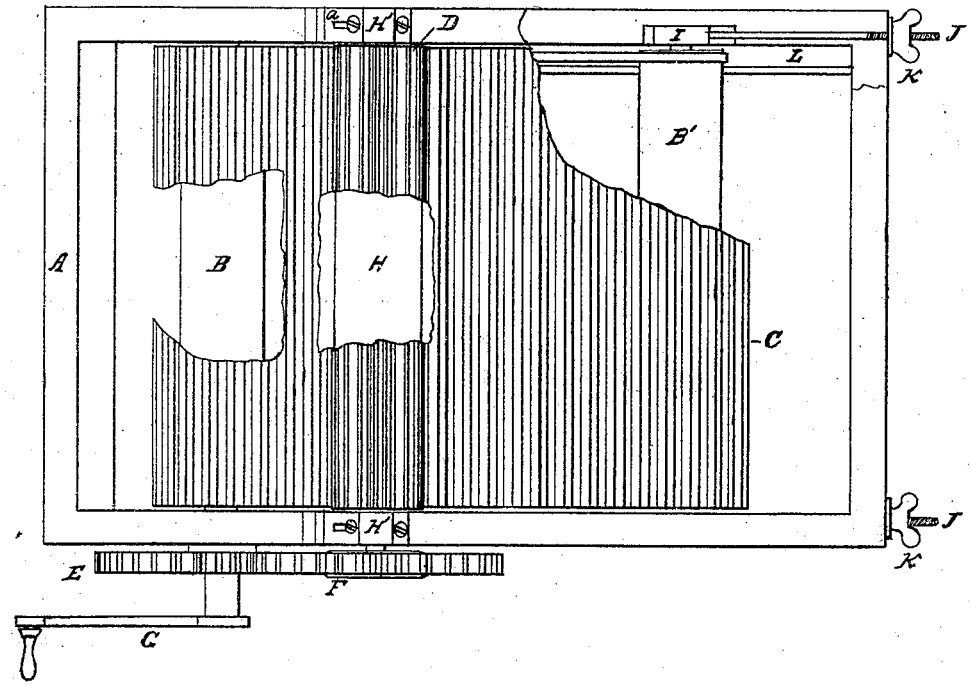
Figure 2:
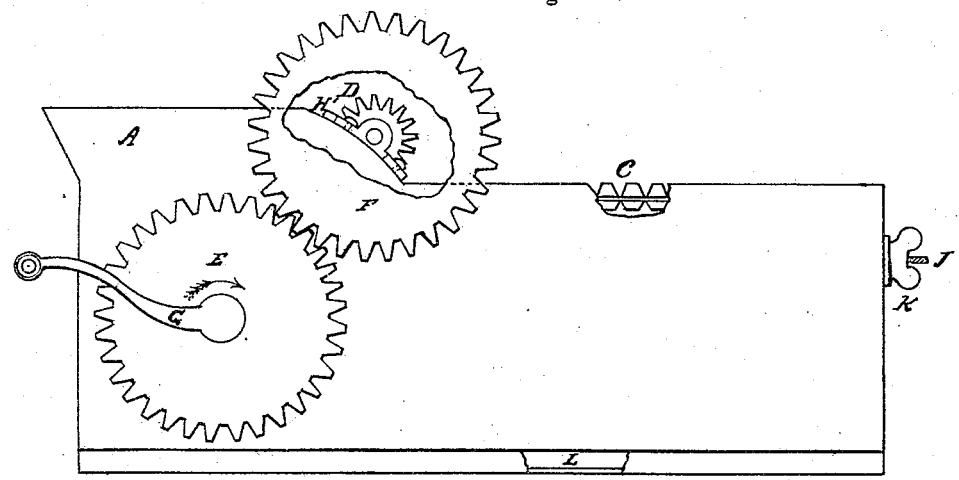

Figure 1 is a top or plan view of my improved device, and Fig. 2 a side elevation of the same.

Like letters of reference indicate like parts.

In the drawing, A represents the hopper. B and B' are rollers, having bearings in the hopper. C is an endless apron, arranged over the rollers B and B'. The apron C consists of a number of slats, arranged together side by side across the hopper, and attached to one or more flexible bands arranged over the rollers B and B'. The lateral fans of the slats constituting the apron are beveled in the manner shown in Fig. 2, so that the exposed side of the apron will be corrugated, when the slats are arranged adjacent to or in contact with each other. D is a corrugated roller, having bearings on the hopper A, and arranged above the apron C. E is a spur-wheel rigidly attached to one of the arbors or spindles of the roller B; and F is also a spur-wheel rigidly attached to one of the spindles of the roller D, and arranged to engage the wheel E. G is a crank attached to the spindle of the roller B. H is a roller having bearings in the hopper A, and arranged to support the apron C at a point below the roller D. H' H' are the bearings of the roller D, and that part of the hopper A which receives them lies in the arc of a circle, of which the axis of the roller B is the center, and these bearings are, and may be, arranged at a greater or less distance above the apron without being disconnected from the driving-gearing, and attached to the case by means of screws passing through the said slots. I represents one of the bearings of the roller B', and each of these bearings consists of a box arranged in a longitudinal recess in the sides of the hopper. J J are rods attached to the bearings I I, and extending through the end of the hopper. The outer end of each of these rods is made screw-threaded, and K K are nuts provided with ears, and run upon the screw-threaded ends of the rods J J. L is a trough arranged along the lower inner edge of one side of the hopper.

In order to operate my improved butter-worker, the hopper is arranged over a suitable vat, and the butter is arranged in the deepest part of the hopper or case and upon the apron. The crank is then turned in the direction indicated by the arrow, and the butter is thus compressed between the roller D and the apron. The hopper should be inclined, the side on which the trough is arranged being the lowest, and the water and milk pressed from the butter will then be drained across the apron and toward the side of the hopper on which the trough is arranged, and into the trough, from which it flows into any suitable receptacle arranged to receive it.

After the butter has passed between the apron and the roller D, it is carried on the apron toward the foot of the hopper and falls into the vat.

In order to work the butter thoroughly, it should be passed between the presser-roller D and the apron C, continuously in the same direction, and as often as may be necessary to make the butter sufficiently dry and to bring it into a proper condition for being packed.

It will be observed from the foregoing description that the presser-roller D is adjustable vertically with relation to the apron, and that the apron may be readily tightened or loosened by means of the nuts K K.

I do not intend to limit myself to the corrugations in the roller D, as a smooth presser-roller, or any equivalent device by which the butter is pressed against the apron C, will answer the same purpose; but in practice I prefer the corrugated presser-roller.

Having thus described my invention, what I claim as new, and desire to secure by Letters Patent, is—

In a butter-worker, the combination and arrangement of the endless and corrugated apron C, the adjustable and corrugated roller D, and the adjustable roller B', substantially as and for the purposes specified.

DANIEL W. DAKE.

Witnesses:
N. C. GRIDLEY,
F. F. WARNER.